United States Patent Office 3,562,042
Patented Feb. 9, 1971

3,562,042
JOINING MOLDINGS OF EXPANDED OLEFIN POLYMERS
Johann Zizlsperger, Frankenthal, Pfalz, and Hermann Tatzel, Ludwigshafen (Rhine), Germany, assignors to Badische Anilin- & Soda-Fabrik Aktiengesellschaft, Ludwigshafen (Rhine), Germany
Filed Apr. 29, 1968, Ser. No. 724,757
Claims priority, application Germany, Apr. 28, 1967,
P 17 04 473.4
Int. Cl. B32b 5/18
U.S. Cl. 156—78      4 Claims

ABSTRACT OF THE DISCLOSURE

Articles having homogeneous foam structure are obtained by welding expanded olefin polymer moldings together at elevated temperature when the expanded olefin polymer still contains expanding agent when subjected to welding and the surfaces to be welded have temperatures which are 5° to 30° C. below the melting point of the olefin polymer.

---

Figure 1:
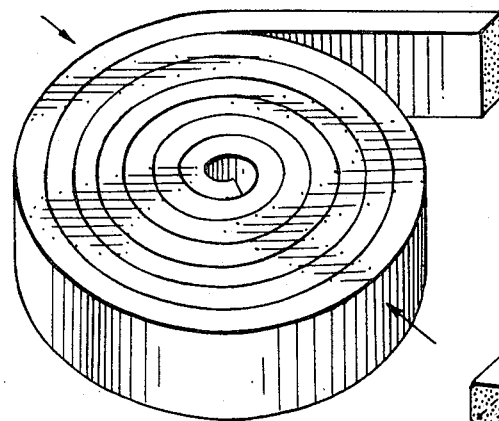

The invention relates to a process for joining expanded olefin polymer moldings in which the molding which still contains expanding agent and which has been superficially heated is welded together.

It is known that expanded thermoplastics moldings can be joined together superficially by HF methods (high-frequency methods).

In this way for example laminated moldings can be prepared from boards or for example tubes may be prepared by winding a strip onto a core, joining the molding at the surfaces of contact and then removing the core.

Such methods have the disadvantage that an adhesive has to be used. Moreover the behavior of the joints to solvents is different from that of the remaining expanded material. Furthermore the moldings can only be joined together after shrinkage has been compensated for.

It is an object of this invention to provide a method of joining expanded olefin polymer moldings in which it is not necessary to use an adhesive. A further object of the invention is to provide a method of joining expanded olefin polymer moldings in which products are obtained which exhibit homogeneous foam structure at the joints as well.

We have found that these objects can be achieved by a method in which the moldings which still contain expanding agent and whose surfaces have temperatures which are from 5° to 30° C. below the melting point of the olefin polymer used are welded together by pressing one against the other.

It is surprising that moldings having an eminently homogeneous foam structure are obtained in this way because according to accepted views it was to be expected that the foam structure would have been destroyed at the welds at the temperatures used according to the invention.

The expanded olefin polymer moldings may have any desired shape; they may be for example fibres, preferably monofils, sections, boards, sheeting and blocks from foam balls or from laminated foam strands.

Olefin polymers of olefin prepared by conventional methods, particularly polymers of monoolefins having two to four carbon atoms, monoolefin polymers whose X-ray crystallinity at 25° C. is more than 25% are particularly suitable for the process. Thus for example homopolymers of ethylene or propylene or copolymers of these two monomers are suitable. Copolymers of ethylene with other ethylenically unsaturated monomers, which contain at least 50% of polymerised units of ethylene, are particularly suitable for the process. Copolymers of ethylene with 5 to 30% by weight of monoethylenically unsaturated aliphatic monocarboxylic esters having four to eight carbon atoms, such as esters of acrylic acid or methacrylic acid or carboxylic vinyl, esters are especially suitable. Acrylic esters of linear or branched alkanols containing one to four carbon atoms and vinyl esters of saturated monocarboxylic acids having two to four atoms are especially suitable as comonomers. Esters of acrylic acid with n-butyl alcohol and with tertiary butyl alcohol and also vinyl acetate have particular importance among the comonomers. Mixtures of olefin polymers with each other or with other polymers, particularly with 5 to 20% by weight thereof with reference to the amount of olefin polymer and other polymers, may also be used. The olefin polymers in general have melt indexes of 0.2 to 20, preferably from 1 to 5, g./10 minutes measured to ASTM D–1238–57T.

The expanding agent used usually has a vapor pressure of more than 4 atmospheres gauge at the melting temperature of the polymers in question.

Examples of suitable expanding agents are hydrocarbons whose boiling points are lower than the softening temperature of the olefin polymers, such as propane, butane, pentane or halohydrocarbons such as tetrafluorodichloroethane. Branched saturated aliphatic hydrocarbons having five to seven carbon atoms and at least two lateral methyl groups and whose boiling points at atmospheric pressure are from —10° C. to +60° C., especially isobutane, are particularly suitable. In addition to isobutane, the following are particularly advantageous: 2,2 - dimethylpropane, 2,2 - dimethylbutane and 2,3 - dimethylbutane.

In general the amount of expanding agent used is such that the mixture of thermoplastic olefin polymer and expanding agent contains 5 to 35 parts by weight of the branched saturated hydrocarbon with reference to 100 parts by weight of polymers. Sometimes small amounts of other expanding agents, for example up to 20% by weight of a linear aliphatic hydrocarbon with reference to the total amount of expanding agent, may also be used. The amount of expanding agent depends on the desired unit weight of the expanded olefin polymer and the pressure and temperature conditions during processing.

Other additives, such as fillers, flame retardants, nucleating agents or dyes, may be incorporated in the olefin polymer prior to expansion, i.e. prior to the production of the moldings to be joined together. Sometimes moldings and molded structures having particularly advantageous properties are obtained when the mixtures to be expanded contain fibrous fillers.

Furthermore the mixtures from which the moldings to be joined are formed may advantageously contain additives which prolong the period of time during which the expanded olefin polymer moldings can be welded together. Examples of suitable additives for this purpose are hydrocarbons which have vapor pressures of from 0 to 2 atmospheres gauge at the melting temperature of the polymer in question and which have boiling points which are higher by up to 60° C. than the boiling point of the expanding agent used.

The expanded olefin polymer moldings (open-celled or closed-celled and if desired slightly crosslinked) may be prepared with equipment conventionally used for the production of expanded styrene polymers. They are advantageously obtained by extruding a mixture of expanding agent and olefin polymer with or without additives through a conventional molding apparatus and expanding the plasticized olefin polymer mixture leaving the molding apparatus.

An advantageous embodiment of the invention consists in welding the expanded olefin polymer moldings together immediately after they have been prepared by extrusion, when their surfaces have temperatures of from 5° to 20° C. below the melting point of the olefin polymer. To obtain a firm joint between the surfaces to be welded together it is adequate in most cases to press the surfaces together lightly, for example with a pressure of 0.01 to 0.05 atmosphere gauge. The welds have as a rule the same ultimate tensile strength as the expanded plastic and are homogeneous and uniform. When it is desired to weld together moldings of expanded mixtures of different monoolefin polymers whose melting points are different from each other, the temperature during welding should be from 5° to 30° C. below the melting point of the mixture of polymers.

The process according to the invention is suitable for example for joining bands, strips, strands, sections, boards, plates, sheeting and blocks of expanded olefin polymers.

The invention is further illustrated by the following examples, Exaples 1 to 5 being with reference to FIGS. 1 to 5 respectively of the drawing. The parts and percentages given in the examples are by weight.

EXAMPLE 1

A strip having the dimensions 7 cm. x 2 cm. is continuously extruded at a rate of 25 kg. per hour from a terpolymer having a melting point of 95° C. (melt index 5 g./10 minutes) of 80% of ethylene, 10% of tertiary-butyl acrylate and 10% of acrylic acid with an addition of 25% (with reference to the polymer) of a mixture (50:50) of isobutane and n-butane as an expanding agent and is wound up under slight tension on a rotating spool located downstream of the extrusion die. The temperature of the surface of the strip is from 70° to 80° C. A disc-shaped expanded board having the thickness of 7 cm. and a diameter of 1 metre can be prepared every five minutes. It may be used as a padding base or as a packaging acid (see FIG. 1).

EXAMPLE 2

Figure 2:
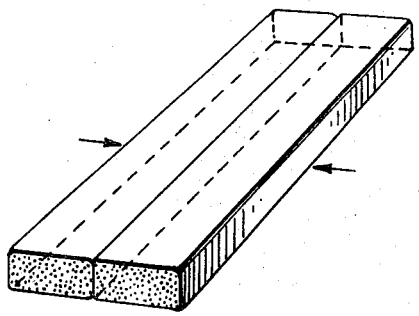

A copolymer of 85% of ethylene and 15% of ethyl acrylate (melting point 98° to 100° C., melt index 1 g./10 min.) is expanded with 20% (with reference to the polymer) of an expanding agent consisting of 97% of isobutane and 3% of n-pentane by passage through an extruder at the rate of 80 kg./hour to form a strip having the cross-sectional dimensions 14 cm. x 3 cm. The extruded strip is cut into lengths of 2 meters and the sides are joined together at a surface temperature of 88° C. with the application of slight pressure to form a board having the dimensions 28 cm. x 3 cm. x 200 cm. A welded joint is obtained which has the same ultimate tensile strength as the foam, provided welding is effected within seven minutes at ambient room temperature or within twenty minutes after preparation of the foam if it is stored at 70° C. (FIG. 2).

EXAMPLE 3

Figure 3:
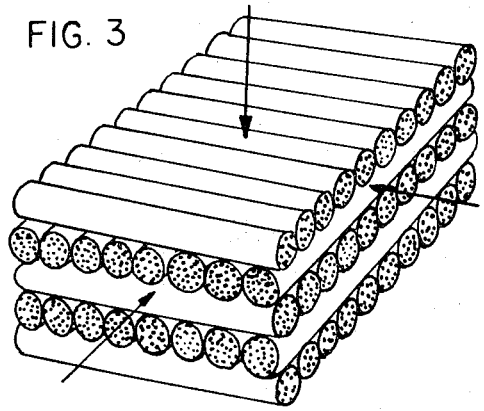

A mixture of 90% of polypropylene (melt index 10 at 210° C., melting point 170° C.) and 10% of polyisobutylene (molecular weight 200.000 determined according to Duch and Küchler, Zeitschrift fur Elektrochemie, vol. 60, 218 (1956) is expanded with 28% (with reference to the polymers) of a mixture of 98 parts of 2,2'-dimethylpropane and 2 parts of n-hexane through a circular die at a rate of 60 kg. per hour to form a strand having a diameter of 10 cm. which is cut into lengths of 1 meter. By laying the lengths side by side to form layers one above the other at right angles with slight pressure at a surface temperature of 142° to 150° C. as indicated in FIG. 3, an expanded polymer block is obtained having the dimensions 1 m. x 1 m. x 1 m. and a density of 30 g./liter.

EXAMPLE 4

Figure 4:
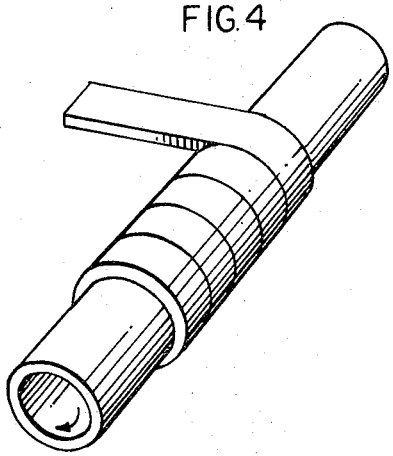

A polymer mixture of 80 parts of polyethylene (melting point 110° C., melt index 0.5 g./10 minutes, density 0.92 g./cm.³) and 20 parts of a commercial ethylene-propylene rubber, which mixture has been homogenized by plasticization, has 1 part of sulfur, 2 parts of zinc oxide, 1 part of stearic acid and 0.8 part of diphenylguanidine added to it, is mixed in an extruder with 22% (with reference to the polymers) of an expanding agent mixture of 98 parts of isobutane and 2 parts of trichloroethane, and expanded to form a strip having the dimensions 10 cm. x 1 cm. The strip obtained is wound onto a rotating metal cylinder which has been preheated to 100° C., the surface temperature of the strip being 85° C. Owing to the weldability of the expanded polymer strip immediately after manufacture the strips may be joined together to form a coherent insulation by the new process (FIG. 4).

EXAMPLE 5

Figure 5:
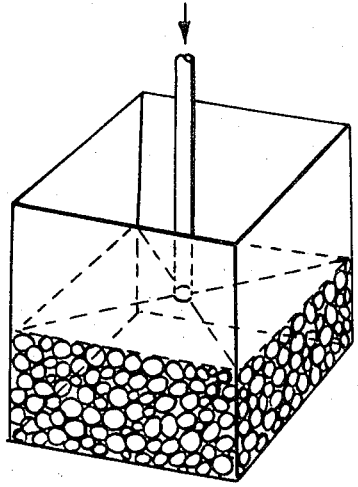

A mixture consisting of 80 parts of a copolymer of 88% of ethylene and 12% of vinyl acetate (melting point 105° C., melt index 1.28 g./10 minutes) and 20 parts of polypropylene (melt index 10 at 210° C., melting point 170° C.) is processed with tetrafluorodichloroethane as expanding agent in an extruder provided with a face cutting device into expanded plastics particles having a diameter of 1 cm. which are introduced as a loose filling into a mold made from perforated plates which is kept at 90° C., in a drying cabinet. After the mold has been filled, the expanded plastics particles (whose surface temperature is about 90° C.) are compressed to half their bulk volume and cooled under a pressure of 0.01 atmosphere gauge (FIG. 5). A stable foam block is obtained which can be removed from the mold after one hour.

We claim:
1. A process for joining expanded moldings of polymers of monoolefins containing two to four carbon atoms by pressing the moldings together at elevated temperature wherein the moldings of monoolefin polymers contain expanding agent from their preparation and have a surface temperature which is from 5° to 30° C. below the melting point of the monoolefin polymers.

2. A process as claimed in claim 1 wherein the monoolefin polymers have melt indexes of from 0.2 to 20 g./10 minutes.

3. A process as claimed in claim 1 wherein the moldings contain as expanding agent a branched saturated aliphatic hydrocarbon having at least two lateral methyl groups whose boiling point at atmospheric pressure is from −10° C. to +60° C.

4. A process as claimed in claim 1 wherein copolymers of ethylene with 5 to 30% by weight of monoethylenically unsaturated aliphatic monocarboxylic esters having four to eight carbon atoms are the main constituent of the expanded moldings.

References Cited

UNITED STATES PATENTS

| | | | |
|---|---|---|---|
| 3,075,868 | 1/1963 | Long | 156—244 |
| 3,077,428 | 2/1963 | Henser et al. | 156—306 |
| 3,213,071 | 10/1965 | Campbell | 156—77 |
| 3,282,766 | 11/1966 | Wright | 156—306 |
| 3,346,686 | 10/1967 | Collins | 156—306 |
| 3,380,868 | 4/1968 | Moser | 156—306 |
| 3,396,062 | 8/1968 | White | 156—244 |
| 3,398,035 | 8/1968 | Cleereman et al. | 156—244 |

REUBEN EPSTEIN, Primary Examiner

U.S. Cl. X.R.

156—244, 306; 161—247